(No Model.) 5 Sheets—Sheet 2.
C. F. HEINRICHS.
DYNAMO ELECTRIC MACHINE.

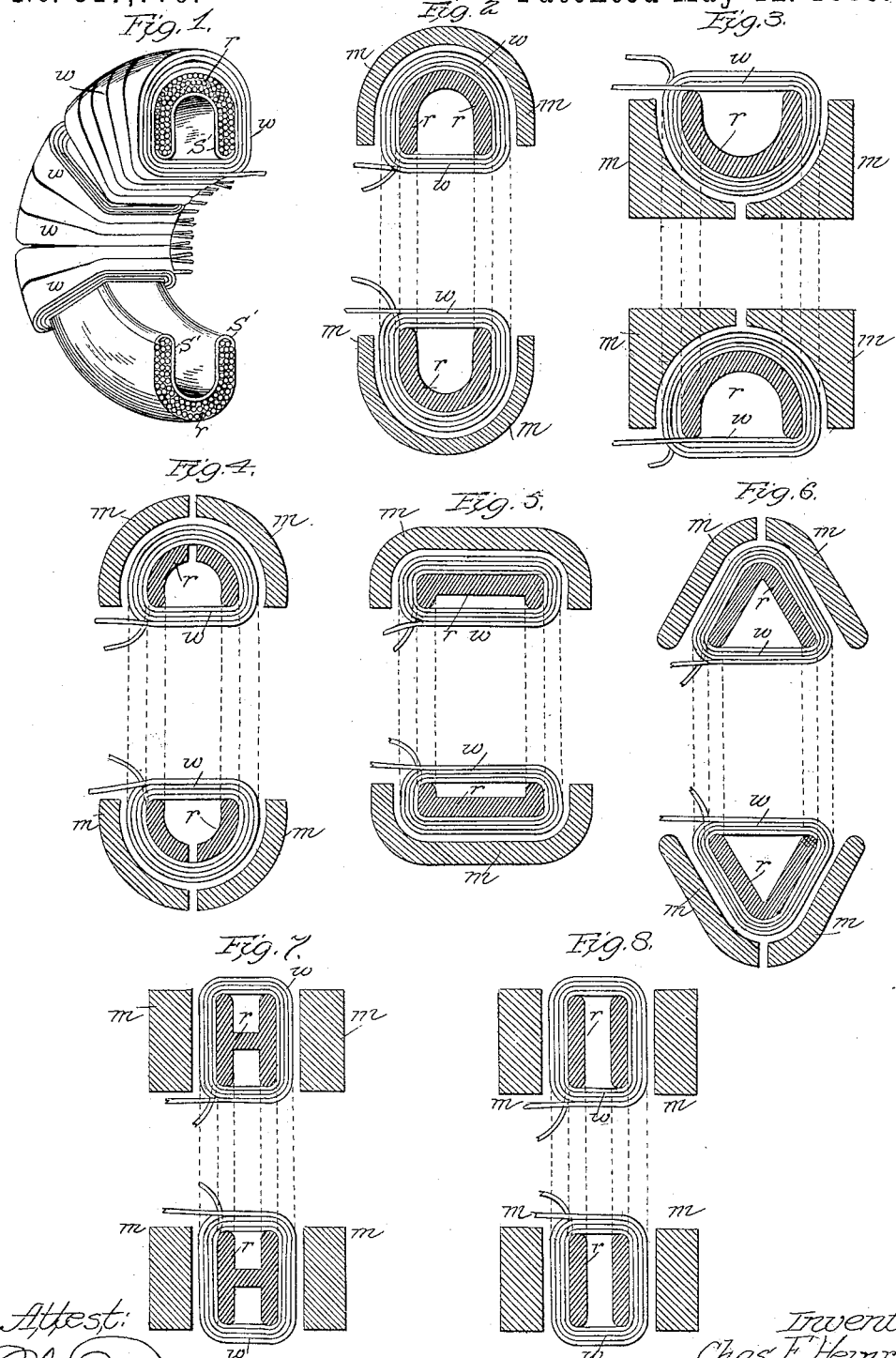

No. 317,779. Patented May 12, 1885.

Attest
Walter Donaldson
F. L. Middleton

Inventor:
Chas. F. Heinrichs
by Joyce Spear
Attys (No Model.) 5 Sheets—Sheet 3.

C. F. HEINRICHS.
DYNAMO ELECTRIC MACHINE.

No. 317,779. Patented May 12, 1885.

Attest:
Walter Donaldson
F. L. Middleton

Inventor
Chas. F. Heinrichs
by Doyen & Shea
Att'ys.

(No Model.)
5 Sheets—Sheet 4.

C. F. HEINRICHS.
DYNAMO ELECTRIC MACHINE.

No. 317,779. Patented May 12, 1885.

Attest:
Walter Donaldson
F. L. Middleton

Inventor
Chas. F. Heinrichs
by Joyce & Spear
Attys.

(No Model.) 5 Sheets—Sheet 5.
C. F. HEINRICHS.
DYNAMO ELECTRIC MACHINE.
No. 317,779. Patented May 12, 1885.
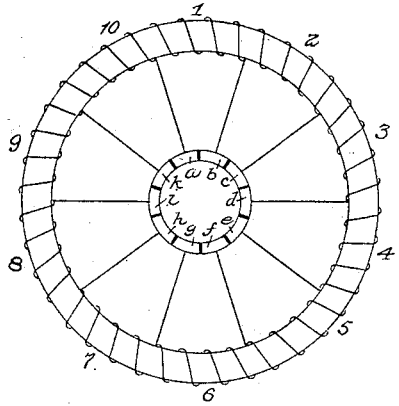
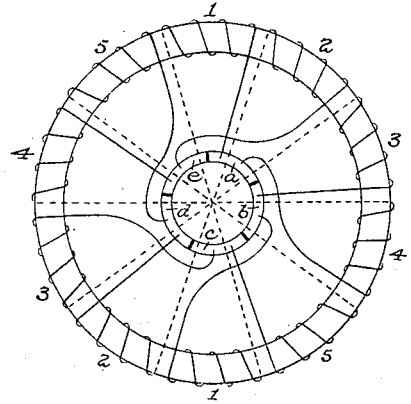
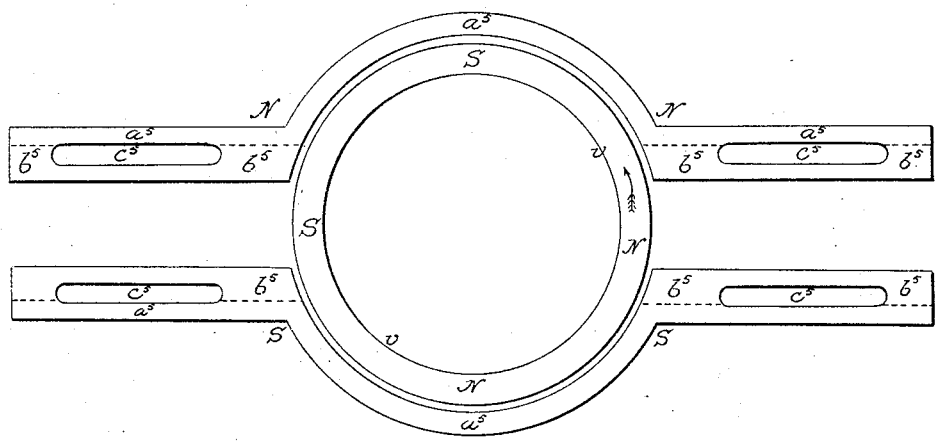
Attest:
Walter Donaldson
F. L. Middleton
Inventor
Chas. F. Heinrichs
by Joyce & Spear
Attys

UNITED STATES PATENT OFFICE.

CHARLES FREDERICK HEINRICHS, OF NEW YORK, N. Y.

DYNAMO-ELECTRIC MACHINE.

SPECIFICATION forming part of Letters Patent No. 317,779, dated May 12, 1885.

Application filed December 15, 1884. (No model.) Patented in England November 11, 1879, No. 4,589; in France May 7, 1880, No. 130,646, and in Germany May 21, 1880, No. 13,802.

*To all whom it may concern:*

Be it known that I, CHARLES FREDERICK HEINRICHS, of New York, in the county of New York and State of New York, have invented a new and useful Improvement in Apparatus for Generating Electric Currents for Electric Lighting, Transmission of Motive Power, and other Purposes; and I do hereby declare that the following is a full, clear, and exact description of the same.

My invention relates to apparatus for generating electric currents to be used in electric lighting, for the transmission of motive power, or for chemical decomposition or other purposes, such having been patented to me in England November 11, 1879, No. 4,589; Germany May 21, 1880, No. 13,802, and France May 7, 1880, No. 130,646.

The part of this apparatus which my invention more particularly concerns is the ring-armature or induction-coil of the class well known as the "Pacinotti" type.

My invention consists, substantially, of a ring-armature wound with insulated wire and chambered or recessed on the side or sides not exposed to the inducing-magnet.

It consists, also, of an improvement in the iron core when the same is made of sections instead of solid iron, formed of a frame-work or shell wound with sections of iron wire piled one upon the top of the other, in the manner hereinafter explained.

Figure 9:
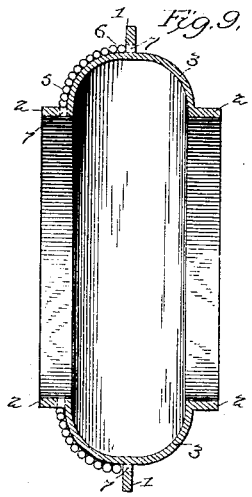

In the drawings, Figure 1 represents in perspective a partially-sectional elevation of a ring-armature made according to my invention. Figs. 2, 3, 4, 5, 6, 7, and 8 are modifications of my invention. Fig. 9 is a central cross-section of my improved core, and Fig. 10 a side elevation of the same. Fig. 11 is an elevation, partly in section, of the complete machine. Fig. 12 is a central longitudinal section of the same. Figs. 13, 14, and 15 represent diagrams hereinafter fully described.

It will be seen that the shape of the ring-core enables me to wind the insulated conducting-wire on the outer surface thereof only, while the inner surface has no influence at all upon the insulated conducting-wire. The advantages I obtain by the adoption of this form of ring-core are manifold, and will be easily understood by reference to a few other forms of ring-armatures already in use—namely, armatures in which the ring-core represents in the section a complete body, (as round, square, flat, broad, or long ring,) and the insulated conducting-wire overlies in the section the entire surface of the ring-core. In these armatures the accumulation of heat is very great. The heat naturally produced in all armatures by the many and quick changes of polarity of the core, and by the currents flowing through the insulated conducting-wire, has in these armatures no outlet, as their outer surface only is in contact with the air. This heating causes great loss of current, and also destroys in a short time the insulation of the conducting-wire, when the generator becomes useless. Further, when the ring-core, wound with the insulated conducting-wire in the usual manner, becomes magnetized by the two north and south inducing-magnets, powerful electric currents will be only set up in that part of the conducting-wire which overlies the external surface of the ring-core, while that part of the conducting-wire which overlies the internal surface of the ring-core is too far out of the influence of the inducing-magnets, and is consequently nearly useless, and helps only to increase the internal resistance of the generator. In such ring-armatures the length of the conducting-wire in the section of the ring which is directly under the influence of the inducing-magnets is very short in proportion to the length of the conducting-wire, which is little or not at all under the influence of the inducing-magnets. Again, when the usual ring-armature becomes magnetized by the inducing-magnets the inner surface of the ring-core will show a reverse polarity to the outer surface of the ring-core, which reverse polarities will be equally powerful on both sides of the neutral line. For example, when a given portion of the ring-core passes from the north to the south inducing-magnets, the outer surface of the ring-core acquires north polarity, while the inner surface will have south polarity until this portion of the core passes under the most powerful part of the field of the inducing-magnets, when the inner reverse polarity of the ring will be neutralized, and not until then will the whole section of that portion of the ring-core show one polarity, and not until then will a powerful current be set up in the section of the conducting-wire which overlies that portion of the ring-core. This largely explains the fact that the actual points where the brushes collect sufficient current on these armatures is greatly behind the theoretical points. On the other hand, in generators where the Pacinotti ring-core has been made in the form of a cylinder the wire wound on the cylinder overlies only the outer surface of the core, and the results attained thereby are somewhat similar to those obtained by the employment of my channeled ring-core; but as the insulated copper wire of one section wound on the cylinder-core crosses nearly all the wires of the other sections on the two ends of the cylinder, currents will be set up opposing the main current in those parts of the conducting-wires which are at a given moment in or near the neutral line of the generator, and which are crossed by those conducting-wires in which at the same time the most powerful electric currents are set up—*i. e.*, those which are at that time under the most powerful influence of the inducing-magnets. In addition, the winding of the conducting-wires in the form of a ring-armature does not (in most cases) admit of connecting the several sections of conducting-wire equally under each other in such a manner as to produce at all positions of the armature to the inducing-magnets two perfectly-equal currents in the armature. Now, by the adoption of my channeled ring-core the before-mentioned disadvantages are completely overcome and further advantages gained.

It will be seen by Figs. 1, 2, 3, 4, 5, 6, 7, and 8 in the drawings, which show the different sections of ring-cores constructed according to my invention, that I do not make use of the inner surface of the ring-core $r$, and that the inducing-magnets $m$ $m$, as shown in the sections, surround the entire outer surface of the channeled ring-core; consequently the insulated conducting-wire which overlies that part of the core (and in which the electric currents are set up) is made use of to the utmost, while that part of the insulated conducting-wire which crosses the inside of the ring (and is consequently nearly useless for the production of electric currents) is very short and entirely out of the influence of the reverse polarity of the inner surface of the core. Air can freely circulate in the channel, and in this form of the ring-core the accumulation of heat is prevented by free access of air to the outer and inner surface of the ring-armature.

It is obvious that in generators constructed according to my invention the greatest efficiency can be maintained with the least waste of mechanical power which is required to actuate the generator.

In Fig. 1 I show the principal form of my ring-armature, made of a bundle of iron wire wound round the guard S', which is made of sheet-iron or other suitable material. This guard I may employ in the required shape in all other modifications, Figs. 2, 3, 4, 5, 6, 7, and 8, when I make the channeled ring-core $r$ out of a bundle of iron wire; but I may also make the channeled ring-core of solid iron or sheet-iron. W represents the insulated conducting-wire wound round the coil, as shown, and in which the currents are set up by revolving the channeled ring-core within the poles $m$ $m$ of the inducing-magnets; or the ring may be fixed and the inducing-magnets rotated around the armature. (See Fig. 3.)

Figure 10:
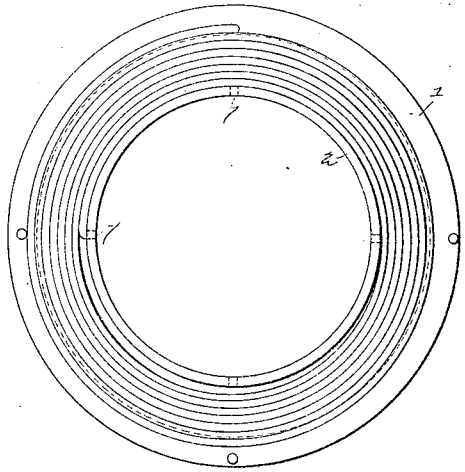
Figure 11:
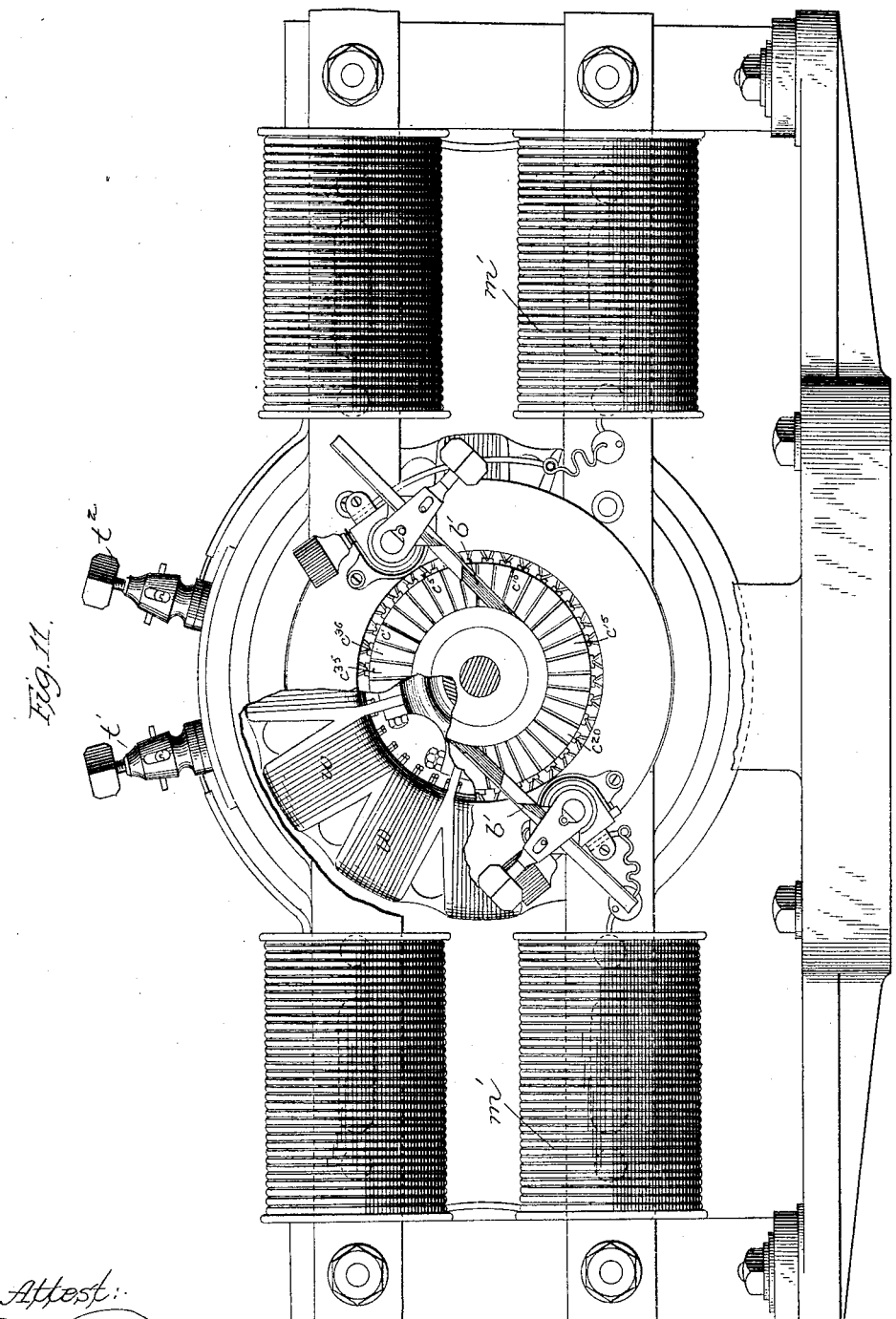
Figure 16:
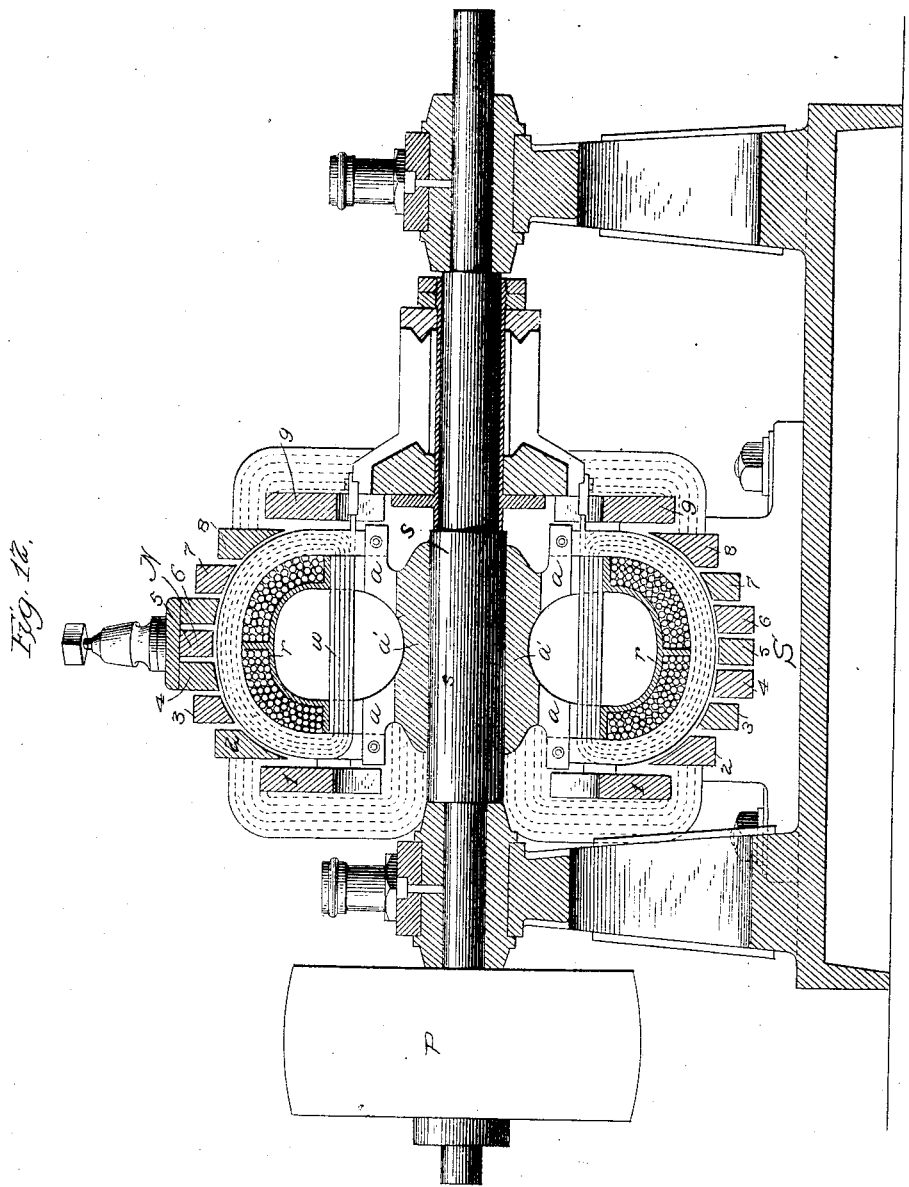

My improved sectional core, hereinbefore referred to, is shown in Figs. 9 and 10. This is adapted to be wound in the manner described; and it consists of an annular frame or shell, which I prefer to make in the form shown in the figures, with flanges 1 2 2; but the flanges may be modified in form without materially changing their function. The annular shell supporting the flanges is shown at 3. The core is built up upon this shell by wires 5 6, wound circumferentially in series of courses between the flanges 1 and 2. The ends are attached and held in place by being inserted in holes 7 in the flanges. These holes are made at regular intervals, being shown a quarter of the circumference distant from each other, this arrangement being for four sections or courses, so as to make the pile uniform and even throughout. The layers are piled one upon the other until the core is brought to a proper size. The number of courses shown is not material. They may be increased or diminished, but the equal spaces into which the ring is divided by the holes made for the ends of the wires must be equal to the number of courses in all cases.

Having thus described the principal part of my invention, I will now describe an apparatus constructed by me in which I effectually employ the channeled ring-armature.

Figs. 11 and 12 show an apparatus for generating an electric current continuously in one direction around the channeled ring-core $r$ $r$. I have wound the insulated conducting-wire $w$ in thirty-six sections, (but I may employ any other number of sections.) I connect the sections with each other by a corresponding number of metal commutator-plates, $c'$ to $c^{36}$, in the usual manner, viz: The one end of the insulated conducting-wire of one section I connect with the beginning of the insulated conducting-wire of the next following section in order by a commutator-plate. I have illustrated this manner of winding the ring-armature in the diagram Fig. 13 with ten sections and connected with ten commutator-plates, (marked in this figure $a\,b\,c\,d\,e\,f\,g\,h\,i\,k$;) or I may connect the sections in the following manner: One end of the insulated copper wire of one section I connect with the beginning of the insulated copper wire of the section which is placed on the opposite side of the ring-core, so as to produce pairs of sections. Several pairs will then be alternately connected with each other and continuously by a corresponding number of commutator-plates. I employ, preferably, such even numbers as 10 14 18 30 42 50, which numbers, when divided in pairs, give an uneven number, so as to enable me to connect the before-mentioned sections of conducting-wire in pairs alternately with each other.

The diagram Fig. 14 shows the ring-armature wound with five pairs of sections which are continuously connected with each other with five commutator-plates, (marked $a\,b\,c\,d\,e$.) I may also use any other known and suitable manner of winding and connecting the coils on the ring-armature.

Upon the shafts $s$ is fixed the boss $a'$. This boss has six radial arms, $a$, (I may also employ any other number of arms,) which carry the channeled ring-core $r$, as shown in the section, Fig. 12. The poles of the inducing electro-magnets N and S, each composed of nine bars, numbered 1 to 9, surround the entire outer surface of the channeled ring-core in the section and about two-thirds of its circumference, as shown in Fig. 11. Instead of making the inducing-magnet of a series of bars, as referred to above, they may be made out of one piece. If the ring-armature is set in motion by the pulley $p$, electric currents will be generated in the insulated copper wire $w$, and may be collected in the usual manner by the brushes $b'\,b^2$ from the commutator $c$. These currents are sent through the coils of the inducing electro-magnets $m'\,m^2$ (which increase their magnetic power) to the terminals $t'\,t^2$, and thence to the lamp or other place where the current is required. It will be seen that each pair of the six arms of the boss $a'$, which hold and carry the channeled ring-core, are open below the channel, through which opening air can freely circulate through the channel of the ring-core.

The currents generated can be employed for the usual purposes—the production of electric light, the transmission of motive power, chemical decomposition, and for many other purposes.

I may alter the details of construction to suit the details of the requirements.

I may use solid, flat, square, round, or any shaped conducting-wire insulated in a suitable manner, as necessity may require.

I may also use the apparatus as a transmitter of motive power when an electric current from another source is sent through it.

In the diagram Fig. 15 is represented the ring-armature $r\,r$, inclosed by the inducing-magnet formed according to my invention.

The parts $a^5$, separated by the dotted lines, show the usual inducing-magnet, bent or formed of iron, but in such form the inducing-magnets have little direct inducing influence upon the ring-armature.

In order to obtain the best results from this class of generators it is essential that the inducing-magnets should have a great direct inducing influence upon the ring-armature at the points where the ring-armature passes from one pole to the other, as it has also to change its polarity. For example, when the ring-armature $r\,r$ rotates in the direction of the arrow, having acquired north polarity during its passage through the south inducing-magnet, and then enters the north inducing-magnet, it is essential that the latter should be very powerful at this point, so as to quickly change the polarity of the ring from north to south, and to effect this I enlarge the size of the inducing-magnets, as shown at $b^5\,b^5$ in the diagram. In order at the same time not to increase considerably the weight of the magnets, I cut them out at the points marked $c^5$, which does not diminish the advantage obtained by the described enlargement.

Having thus described my invention, what I claim is—

1. In the hereinbefore-described apparatus, a ring-armature channeled or recessed on the side or sides away from the inducing-magnet and wound with insulated wire, substantially as described.

2. In the hereinbefore-described apparatus, a channeled ring-armature having the channeled or recessed side away from the inducing-magnet and wound with insulated wire, substantially as described.

3. In the hereinbefore-described apparatus, a core formed of an annular shell or section, and of wires wound circumferentially thereon, the ends being secured at equal spaces from each other and the sections piled one upon another, substantially as set forth.

4. A core formed of a shell of substantially channel shape, having flanges 1 2 2 and the sections of wire wound thereon, substantially as described.

In testimony whereof I have signed my name to this specification in the presence of two subscribing witnesses.

CHARLES F. HEINRICHS.

Witnesses:
F. L. MIDDLETON,
WALTER DONALDSON.